Patented June 4, 1929.

1,716,081

UNITED STATES PATENT OFFICE.

ALFRED E. PARMELEE, OF CARNEYS POINT, NEW JERSEY, ASSIGNOR TO E. I. DU PONT DE NEMOURS & COMPANY, OF WILMINGTON, DELAWARE, A CORPORATION OF DELAWARE.

PROCESS OF RECOVERING DISUBSTITUTED GUANIDINES.

No Drawing.   Application filed January 9, 1924. Serial No. 685,173.

This invention relates to the production of disubstituted guanidines from the corresponding thio ureas and comprises a method of obtaining the substituted guanidines in a pure state from their crude reaction masses. More particularly my new process in its most important aspect relates to the extraction of aromatic disubstituted guanidines such as diphenyl-, ditolyl-, and dixylyl-guanidines from the metal sulfide sludge in which they are respectively contained when they are prepared from the corresponding substituted thio-ureas by the interaction of the thio-urea, ammonia and a basic compound of said metal. Such basic compounds are lead oxide (litharge), basic lead carbonate, white lead, lead hydroxide, and the corresponding compounds of zinc, cadmium and tin.

In the preparation of disubstituted guanidines from the corresponding disubstituted thio-ureas by the interaction of the substituted thio-ureas, ammonia, and a suitable metal compound acting as a desulfurizing agent, the efficiency of the process depends to a considerable extent upon the method employed for isolating the disubstituted guanidines in a pure state. Heretofore the substituted guanidines have been recovered by one or the other of two processes, namely: either (1) by extracting with a suitable solvent such as ethyl alcohol, benzene or toluene, or (2) by extracting with hydrochloric acid and then removing soluble metal salts by converting them into insoluble salts by the addition of sulfuric acid or a soluble sulfate. The first of these two processes is of general application and can be used in all cases, irrespective of the metal used as a desulfurizing agent. However, the use of a solvent such as ethyl alcohol necessitates the distilling off of the solvent and the subsequent purification of the guanidine. The use of hydrochloric acid and the back precipitation of the metal with sulfuric acid is restricted to processes in which compounds of lead have been used as desulfurizing agents. Also there is no satisfactory means whereby the amount of soluble sulfate or sulfuric acid to be added can be conveniently determined and the addition of an excess of reagent will result in the loss of material due to the formation of insoluble guanidine sulfates.

I have now found that a more efficient procedure is to extract the diaryl-guanidine from the metal sulfide sludge, after the removal of excess ammonia and alcohol if it has been used in the reaction, by dissolving it in hydrochloric acid. The reaction mass after removing ammonia and alcohol is placed in a wooden tub or other suitable vessel and is made acid to litmus paper with hydrochloric acid at a temperature between 60 and 85° C. When the reaction mass has been made permanently acid, sodium carbonate in water solution is added until a faint alkalinity is shown on brilliant yellow paper. The charge is then filtered and the guanidine derivative is precipitated from the filtrate so obtained by adding caustic alkali until an alkaline reaction is obtained with Clayton yellow paper. This method of extraction is more desirable than formerly described methods, for it eliminates the use of solvents and the losses incident to their recovery, also it is more desirable than the previously described methods in which extraction is made with acid because the use of sodium carbonate makes it possible to determine when sufficient reagent has been added and this eliminates the loss of guanidine due to the formation of the insoluble sulfate of guanidine. The use of sodium carbonate has the further advantage of removing ferric iron and also some of the tarry impurities formed during the reaction.

As an example of the use of the method in connection with the production of diphenylguanidine, the following procedure may be given. Thiocarbanilide, ammonia and basic lead carbonate are allowed to react in the usual manner in either an alcohol or aqueous medium according to previously well known methods. When the reaction has been completed two molecular proportions of caustic soda for each molecular proportion of lead carbonate used in the reaction are added to the reaction mass and the excess ammonia, along with the alcohol if it has been used, are removed by steam distillation. The reaction mass is then transferred to a tub or other suitable vessel, is heated to a temperature between 60° and 85° C. and is then made acid to litmus paper with hydrochloric acid. Sodium carbonate in water solution is then added until a faint alkalinity is shown to brilliant yellow paper. The reaction mass is then filtered and the diphenylguanidine precipitated from the filtrate by the addition of caustic soda in the previously well known manner.

The method which has been described for diphenylguanidine can be used with equal succcess for the extraction of any of the diaryl substituted guanidines such as diorthotolylguanidine, diaparatolyl-guanidine and diparaxylyl-guanidine.

The method which has just been described can be used also for the elimination of salts of any of the metals ordinarily used as desulfurizing agents, such as zinc, cadmium, tin and lead.

I claim:

1. In the process of separating and purifying a disubstituted guanidine, produced by desulfurization of a thio-urea, the steps which comprise dissolving the mixture and making the solution acid to litmus paper, adding to the resulting solution an agent having an alkaline reaction until the appearance of the faintest trace of orange color on brilliant yellow test paper, to precipitate the impurities of the mixture, while leaving the disubstituted guanidine in solution.

2. The process of separating and purifying a diaryl-guanidine, produced by desulfurizing a diaryl-thiourea, which comprises removing any excess of ammonia and alcohol present in the reaction mass, acidifying the remaining mixture with an acid which will dissolve the impurities present, and then adding to the resulting solution a sufficient amount of an alkaline-reacting substance to precipitate the impurities of the mixture, while leaving the diaryl-guanidine in solution.

3. A process as set forth in claim 2 in which the remaining mixture is acidified with hydrochloric acid.

4. A process as set forth in claim 2 in which the alkaline-reacting substance added to the acidified mixture is an alkali-metal carbonate.

5. A process as set forth in claim 2 in which the alkali compound having alkaline reaction is sodium carbonate.

6. A process as set forth in claim 2 in which the acid used is hydrochloric acid and the alkaline reacting substance used is alkali metal carbonate.

7. The process of separating and purifying a ditolyl-guanidine produced by desulfurizing a ditolyl-thiourea, the steps which comprise removing any excess ammonia present in the reaction mass, acidifying the remaining mixture with an acid which will dissolve the impurities present, and then adding to the resulting solution a sufficient amount of an alkaline reagent to precipitate the impurities present in the solution while leaving the di-ortho-tolyl-guanidine in solution.

8. The process of separating and purifying a ditolyl-guanidine produced by desulfurizing a ditolyl-thiourea, the steps which comprise removing any excess ammonia present in the reaction mass, acidifying the remaining mixture with an acid which will dissolve the impurities present, and then adding to the resulting solution sufficient amount of an alkali metal carbonate capable of precipitating the impurities present in the solution while leaving the di-ortho-tolyl guanidine in solution.

9. A process as defined in claim 8 in which the acid added is hydrochloric acid, and the alkali compound having an alkaline reaction is sodium carbonate.

In testimony whereof I affix my signature.

ALFRED E. PARMELEE.